United States Patent [19]

Ogo

[11] Patent Number: 4,782,505
[45] Date of Patent: Nov. 1, 1988

[54] X-RAY FILM HOLDING APPARATUS PROVIDING TIGHT CONTACT BETWEEN FILM AND INTENSIFYING SCREEN

[75] Inventor: Yoshimasa Ogo, Ootawara, Japan

[73] Assignee: Kabushiki Kaisha Toshiba, Kawasaki, Japan

[21] Appl. No.: 935,520

[22] Filed: Nov. 26, 1986

[30] Foreign Application Priority Data

Nov. 27, 1985 [JP] Japan ................................ 60-266943

[51] Int. Cl.$^4$ ............................................ G03B 42/04
[52] U.S. Cl. ..................................... 378/187; 378/182
[58] Field of Search ................ 378/187, 176, 185, 182

[56] References Cited

U.S. PATENT DOCUMENTS

| | | | |
|---|---|---|---|
| 2,056,279 | 10/1936 | Kulik | 378/182 |
| 3,870,889 | 3/1975 | Schmidt | 378/187 |
| 4,032,790 | 6/1977 | Nakamura | 378/187 |
| 4,081,686 | 3/1978 | Nieuweboer | 378/187 |
| 4,198,009 | 4/1980 | Turner | 242/71.7 |
| 4,538,294 | 8/1985 | Tamura et al. | |

FOREIGN PATENT DOCUMENTS 2729660  8/1978  Fed. Rep. of Germany .

Primary Examiner—Craig E. Church
Assistant Examiner—T. N. Grigsby
Attorney, Agent, or Firm—Oblon, Fisher, Spivak, McClelland, & Maier

[57] ABSTRACT

An X-ray film holding apparatus includes front and rear plates through which X-rays transmit. The front and rear plates respectively have opposite surfaces. The front plate is flexible, and the opposite surface of the front plate has a partial spherical portion extending toward the rear plate. The spherical surface is curved along a first direction and a second direction perpendicular to the first direction. The front plate is rectangular, and its three sides are supported by a holding frame. An elastic cushion member is adhered to the opposite surface of the rear plate. The cushion member has a surface opposite to the front plate. The opposite surface of the cushion member has a partial cylindrical surface extending toward the front plate. The cylindrical surface is curved along the first direction and parallel to the second direction. Intensifying screen sheets are respectively adhered to the opposite surfaces of the front plate and the cushion member. The holding frame and the rear plate come close to or are separated from each other. An X-ray film can be tightly held between the front plate and the cushion member.

12 Claims, 8 Drawing Sheets

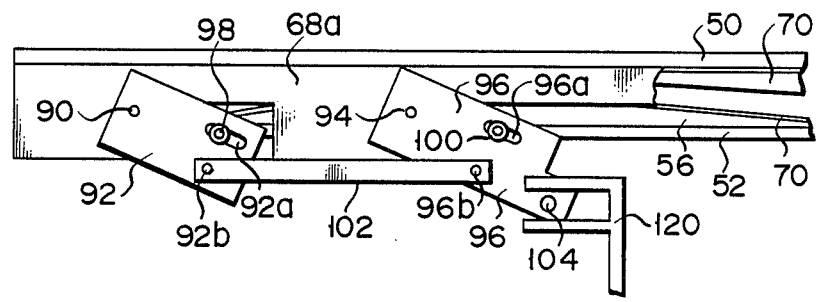
F I G. 12
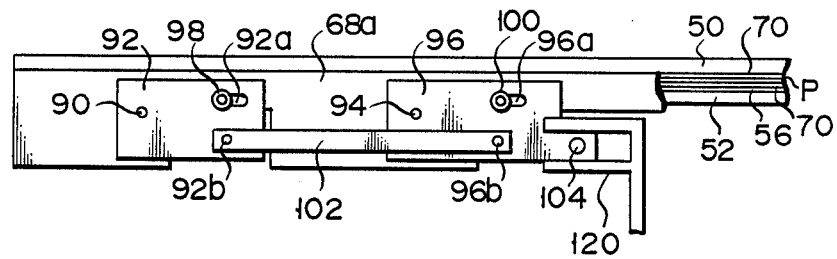
F I G. 13
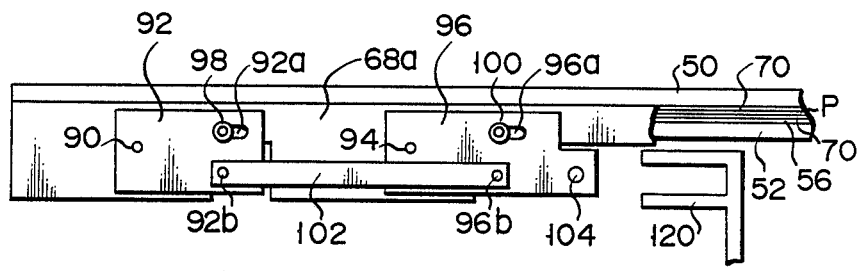
F I G. 14

X-RAY FILM HOLDING APPARATUS PROVIDING TIGHT CONTACT BETWEEN FILM AND INTENSIFYING SCREEN

FIELD OF THE INVENTION

The present invention relates to an X-ray film holding apparatus for holding an X-ray film between intensifying screen sheets in radiography.

BACKGROUND OF THE INVENTION

For example, in an X-ray spot-shot system, if a gap such as an air gap is present between an X-ray film and intensifying screen sheets, a roentgenogram with high quality cannot be expected.

In order to eliminate such a gap, a conventional X-ray film holding apparatus shown in FIG. 1 is proposed (Japanese Patent Disclosure (Kokai) No. 154296/83). The holding apparatus comprises opposite front and rear plates 2 and 4. The front plate 2 has flexibility and is fixed and supported on a frame 6. The front plate 2 is curved and extends toward the rear plate 4. A flat cushion member 8 is mounted on the rear plate 4. Intensifying screen sheets 10 are respectively adhered to the front plate 2 and the flat cushion member 8.

Since the cushion member 8 is flat in the above holding apparatus, air is trapped between the X-ray film and the intensifying screen sheets 10, and the film cannot be brought into tight contact with the screen sheets 10. As a result, the sharpness of the roentgenogram is degraded. Even after the film is brought into contact with the screen sheets 10, no pressure gradient between the front plate 2 and the cushion member 8 occurs (i.e., an isobaric distribution is obtained), and air cannot be removed from the space between the film and the screen sheet.

In order to remove the gap, another X-ray film holding apparatus is also proposed, as shown in FIGS. 2 and 3 (Japanese Patent Disclosure (Kokai) No. 22805/83). In the holding apparatus, semicylindrical cushion members 16 are respectively mounted on opposite surfaces of front and rear plates 12 and 14 coupled by a hinge at the corresponding edges thereof. The generatrices of the members 16 are perpendicular to each other. Intensifying screen sheets 18 are respectively adhered to the upper surfaces of the cushion members 16.

Since one of the cushion members 16 is also mounted at the side of the front plate 12, the front plate 12 is spaced apart by several millimeters from the X-ray film. For this reason, magnification of an object to be photographed is increased, and sharpness of the image is degraded. In addition, since the members 16 are respectively mounted on the plates 12 and 14, the plates 12 and 14 must be opened widely to load the X-ray film, thus resulting in a bulky apparatus.

OBJECT OF THE INVENTION

It is an object of the present invention to provide an X-ray film holding apparatus capable of bringing an X-ray film into tight contact with corresponding intensifying screen means.

SUMMARY OF THE INVENTION

According to an aspect of the present invention, there is provided an X-ray film holding apparatus for holding an X-ray film, comprising:

a front plate through which X-rays transmit and a rear plate, said front and rear plates being provided with opposite surfaces, respectively, said front plate being flexible, said opposite surface of said front plate being provided with a curved portion extending toward said rear plate, said curved portion being curved along first and second directions, the first and second directions crossing to each other;

a holding frame for holding at least part of the periphery of said front plate;

a cushion member having elasticity and provided on said opposite surface of said rear plate, said cushion member being provided with a surface opposite to said front plate, said opposite surface of said cushion member being provided with a curved portion extending toward said front plate, said curved portion of said cushion member being curved along at least one of the first and second directions;

intensifying screen means lain between said opposite surfaces of said front plate and said cushion member; and supporting means for supporting said holding frame and said rear plate to allow tight contact between the X-ray film and said intensifying screen means lain between said opposite surfaces of said front plate and said cushion member.

According to the X-ray film holding apparatus of the present invention, when an X-ray film is loaded therein and pressed by the rear plate, the contact force is radially decreased. In other words, the pressure gradient occurs radially after the X-ray film is pressed. For this reason, no air gap is formed between the film and the intensifying screen means. Even if an air layer is formed between the film and the screen means, it is smoothly eliminated to provide tight contact between the film and the intensifying screen means, thereby obtaining a roentgenogram with high quality.

BRIEF DESCRIPTION OF THE DRAWINGS

FIGS. 5 to 15 show an X-ray film holding apparatus according to an embodiment of the present invention, in which FIG. 5 is an exploded perspective view of a holding unit, FIG. 6 is an exploded sectional view of the holding unit, FIG. 7 is a plan view showing a front plate and a holding frame, FIG. 8 is a sectional view showing the front plate and the holding frame, FIG. 9 is a perspective view of a contact/separation mechanism, FIG. 10 is a plan view showing a carrier mechanism of the holding unit, FIG. 11 is a perspective view showing a drive mechanism of the contact/separation mechanism, FIGS. 12 to 14 are respectively side views for explaining the operation of the holding apparatus, and FIG. 15 is a plan view for explaining the effect of the holding apparatus.

DETAILED DESCRIPTION OF THE PREFERRED EMBODIMENT

Figure 1:
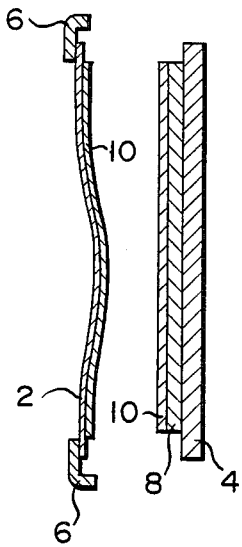
FIG. 1 is a sectional view showing a conventional holding apparatus.
Figure 2:
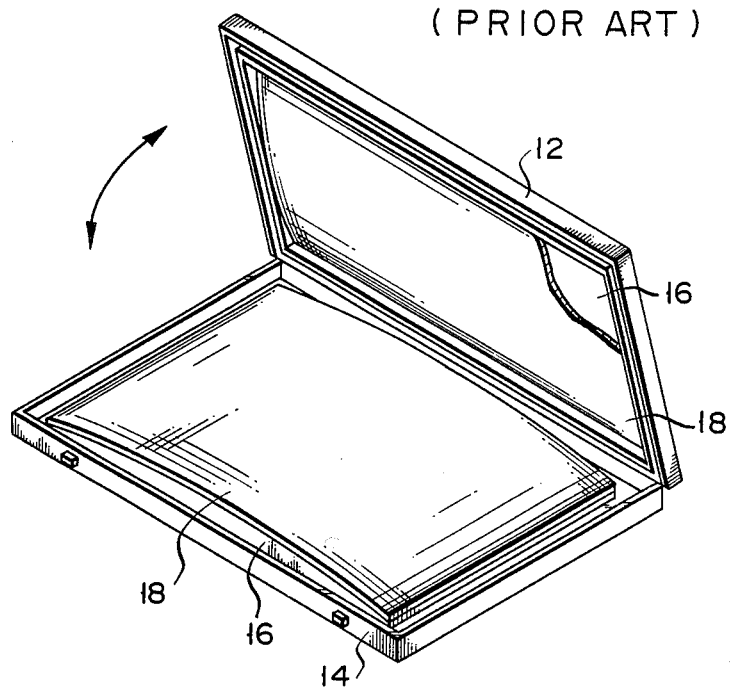
FIG. 2 is a perspective view of another conventional holding apparatus.
Figure 3:
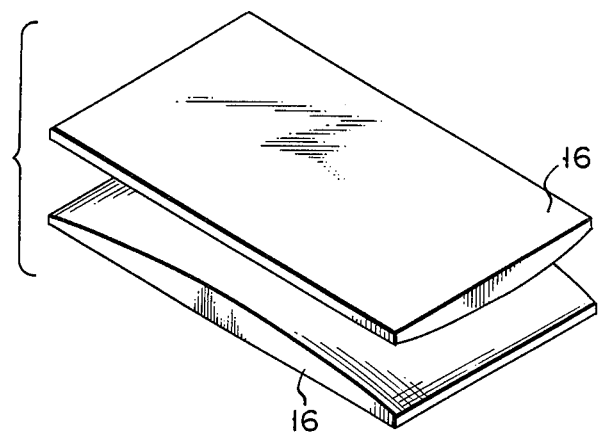
FIG. 3 is a perspective view of cushion members in the holding apparatus of FIG. 2.
Figure 4:
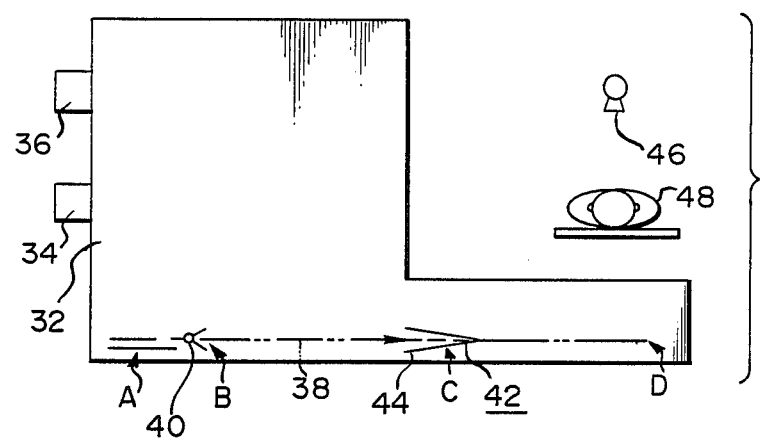
FIG. 4 is a schematic view of an X-ray spot-shot system using an X-ray film holding apparatus according to the present invention.

FIG. 4 shows an X-ray spot-shot system having an X-ray film holding apparatus according to the present invention. Reference numeral 32 denotes a housing. The housing 32 has an L-shaped section. An unused film storage case 34 and a used film storage case 36 are detachably attached to the upper left portion of the housing 32. A film travel path 38 is formed at the bottom of the inside of the housing 32. A film waiting position A, a film dispensing position B, a film setting position C, and a photographing position D are set along the film path 38. A film carrier 40 and an X-ray film holding apparatus 42 are arranged along the film travel path 38. The film carrier 40 conveys unused X-ray film from the film waiting position A to the film setting position C and used X-ray film from the film setting position C to the film dispensing position B. The film holding apparatus 42 conveys the unused X-ray film from the film setting position C to the photographing position D and the used X-ray film from the photographing position D to the film setting position C. The film holding apparatus 42 comprises a film holding unit 44 for holding the X-ray film. A film dispensing mechanism (not shown) and a film storage mechanism (not shown) are also arranged inside the housing 32. The film dispensing mechanism dispenses unused X-ray film from the unused film storage case 34 and conveys it to the film waiting position A. The film storage mechanism conveys the used X-ray film from the film dispensing position A to the used film storage case 36.

The unused X-ray film dispensed from the unused film storage case 34 by the film dispensing mechanism is conveyed to the film waiting position A through the film dispensing position B and waits there. This film is then transferred to the film setting position C by the film carrier 40 and clamped by the film holding unit 44 in the film holding apparatus 42. The film holding unit 44 with the X-ray film is moved from the film setting position C to the photographing position D. An object 48 is exposed with X-rays radiated from an X-ray tube 46 to form a roentgenogram on the film. The film holding unit 44 then returns from the photographing position D to the film setting position C, and the used X-ray film is transferred from the film setting position C to the film dispensing position B by the film carrier 40. The used X-ray film is conveyed from the film dispensing position B to the unused film storage case 36 by the film storage mechanism.

Figure 5:
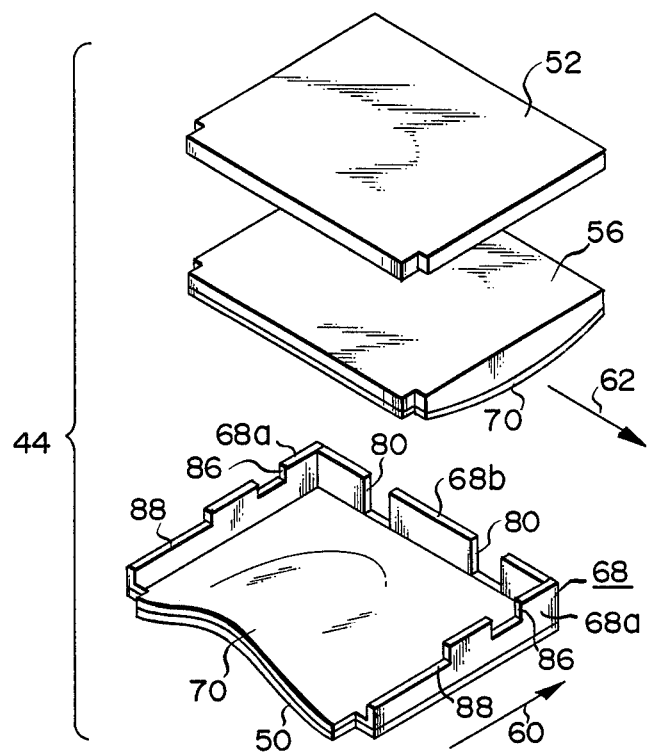
Figure 6:
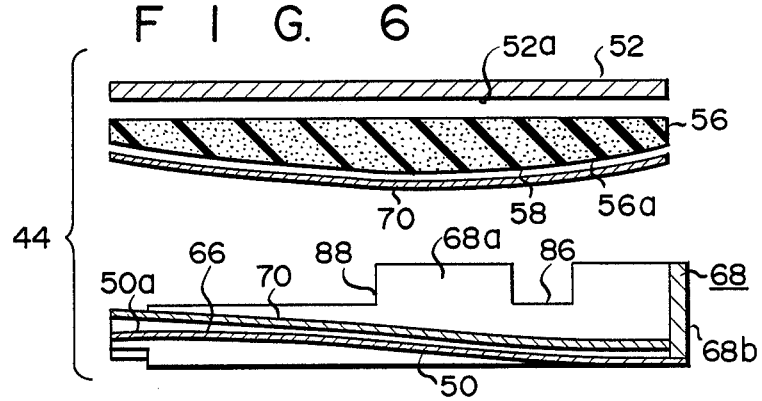

The film holding unit 44 in the film holding apparatus 42 comprises front and rear plates 50 and 52 through which X-rays transmit, and a contact/separation mechanism (to be described in detail later) 54 for bringing the front plate 50 to come close to the rear plate 52 or separating the front plate 50 from the rear plate 52, as shown in FIGS. 5 and 6.

A semicylindrical cushion member 56 having elasticity is adhered to a surface 52a of the rear plate 52 at the side of the front plate 50. The semicylindrical cushion member 56 has a surface 56a opposite to the front plate 50. The surface 56a has a partial cylindrical surface 58. The partial cylindrical surface 58 is curved in a first direction 60 and parallel to a second direction 62 perpendicular to the first direction 60.

Figure 7:
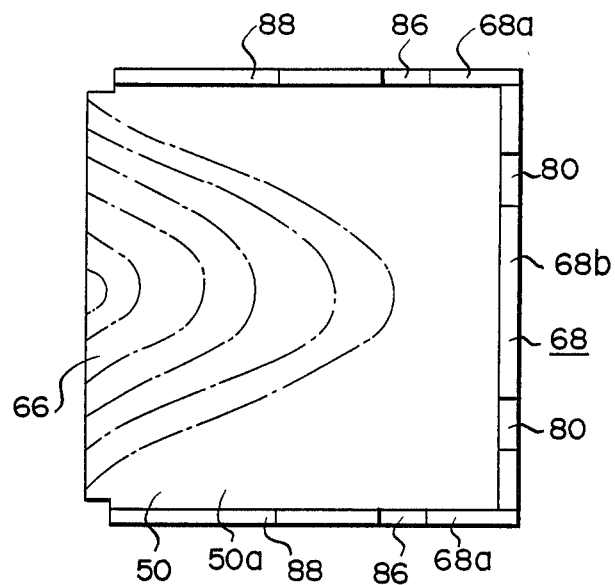
Figure 8:
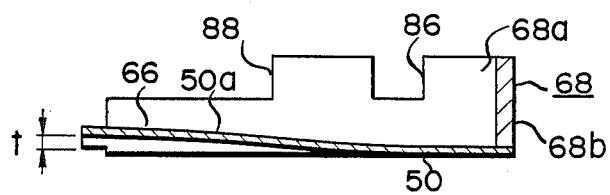

The front plate 50 is flexible and has a surface 50a opposite to the rear plate 52, as shown in FIGS. 5 to 8. The surface 50a has a partial spherical surface 66. The partial spherical surface 66 is curved along both directions 60 and 62. The front plate 50 has a rectangular shape, and three sides thereof are held by a holding frame 68. The holding frame 68 comprises a pair of parallel frame portions 68a and a connecting frame portion 68b for connecting the corresponding ends of the parallel frame portions 68a. The pair of parallel frame portions 68a are parallel to the first direction 60 to hold both sides of the front plate 50. The connecting portion 68b is parallel to the second direction 62 and holds one side of the first plate 50. An X-ray film is inserted between the front and rear plates 50 and 52 from the holding frame side opposite to the connecting frame portion 68b. The curvature of the partial spherical surface 66 reaches a maximum distance t (see FIG. 8) at the front plate portion opposite to the connecting frame portion 68b. The maximum distance t is preferably 3 to 4 mm for an X-ray film having a standard size of 14"×14". It should be noted that the alternate long and short dashed lines in FIG. 7 are contour lines.

Intensifying screen sheets 70 are respectively adhered to the surface 50a of the front plate 50 and the surface 56a of the semicylindrical cushion member 56.

Figure 9:
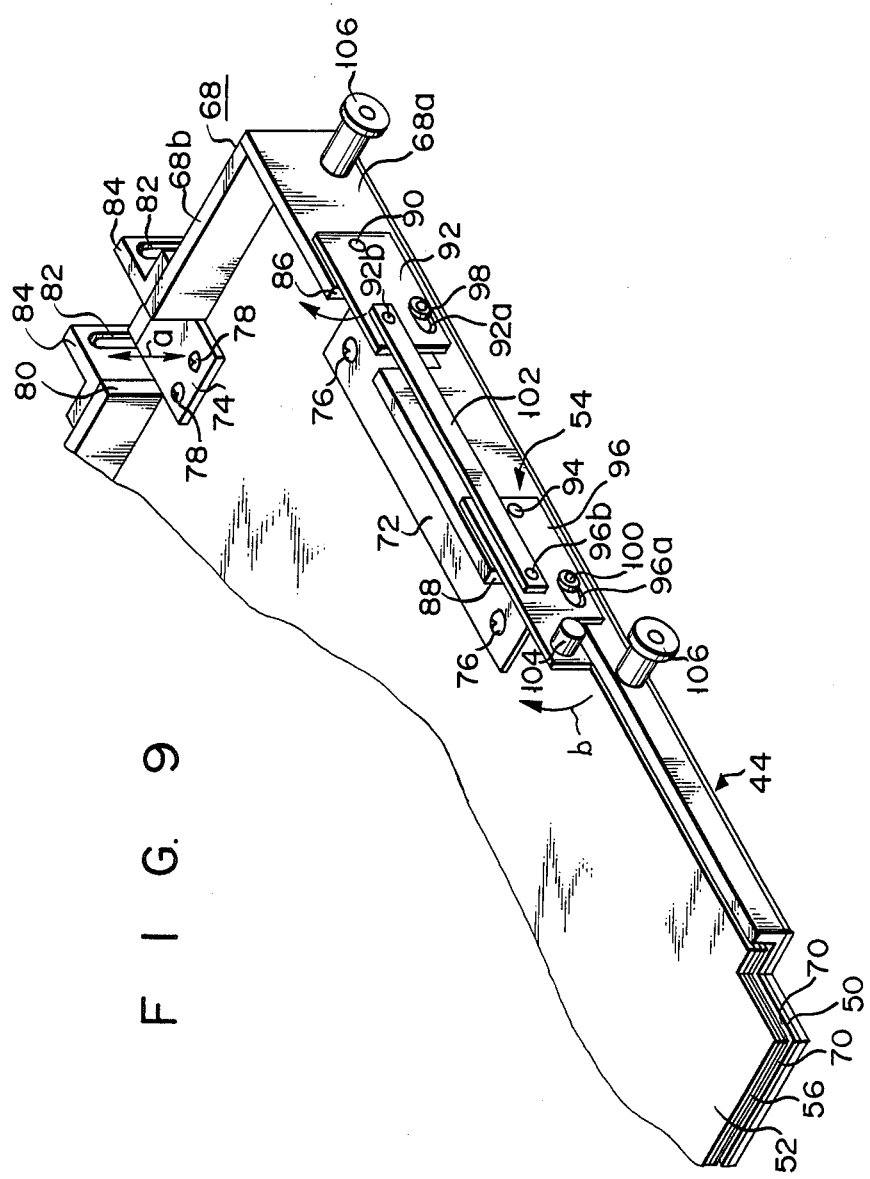
Figure 11:
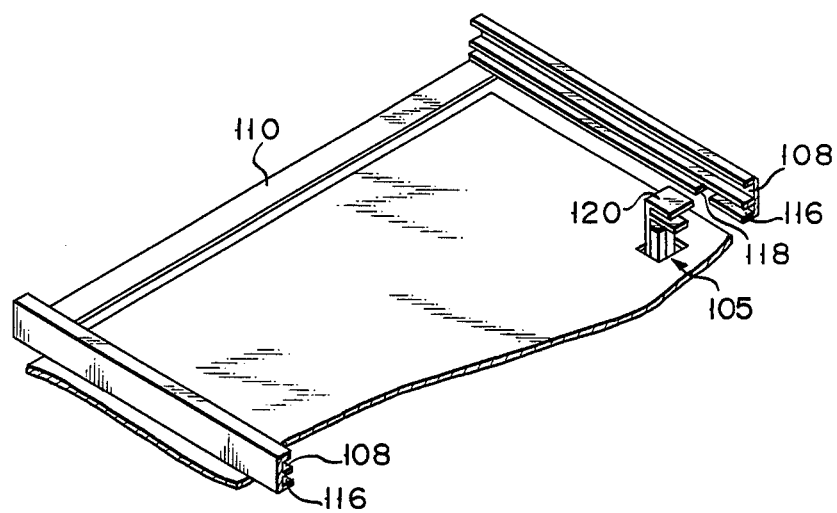

The contact/separation mechanism 54 comprises a rear plate holding piece 72 and a rear plate guide piece 74, as shown in FIG. 9. The rear plate holding piece 72 is fixed by a plurality of screws 76 on the rear plate 52 at the side of one of the parallel frame portions 68a. The rear plate guide piece 74 is fixed by a plurality of screws 78 on the rear plate 52 at the side of the connecting frame portion 68b. A notch 80 is formed in the connecting frame portion 68b to allow movement of the rear plate guide piece 74 along directions of a double-headed arrow a. Guide members 84 each with a slit 82 are mounted on the connecting frame portion 68b to guide the rear plate guide piece 74 along the above-mentioned directions. Notches 86 and 88 are respectively formed at the connecting frame portion 68b side of each one of the parallel frame portions 68a and a frame portion 68a portion away from the connecting frame portion 68b with respect to the center of each one of the parallel frame portions 68a. A pin 90 extends through each one of the parallel frame portions 68a at a position near the connecting frame portion 68b. A first link plate 92 is pivotally supported by each pin 90. Pin 94 extends through the holding frame 68 portion near the connecting frame portion 68b with respect to the notch 88. A second link plate 96 is pivotally supported by each pin 94. Elongated holes 92a and 96a are respectively formed at the free end portions of the first and second link plates 92 and 96. A pair of pins 98 and 100 extending from the rear plate holding piece 72 are inserted in the holes 92a and 96a, respectively. Pins 92b and 96b extend from the free end portions of the link plates 92 and 96 and are coupled by a link rod 102. The first and second link plates 92 and 96 and the link rod 102 constituted a parallel link. When a projection 104 extending on the second link plate 96 is pivoted by a drive mechanism 105 (to be described later in connection with FIG. 11), the link rod 102 is pivoted in a direction of arrow b while the parallel state is maintained. The rear plate 52 is separated from the front plate 50 while the parallel relationship therebetween is maintained. Therefore, an X-ray film can be clamped, loaded, or unloaded.

Figure 10:
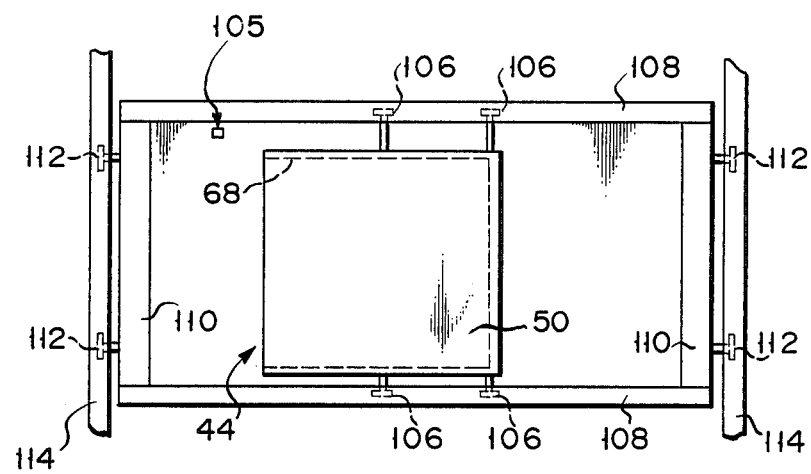

Rollers 106 are respectively mounted on the central portion of each of the parallel frame portions 68a in the film holding unit 44 and on the connecting frame portion 68b side of each of the parallel frame portions 68a. (That is, there are a total of four such rollers, two of which are shown in FIG. 9.) As shown in FIG. 10, the holding frame 68 is movably supported between a pair of guide rails 108 through the four rollers 106. Each end of each guide rail 108 is coupled to a coupling member 110. A plurality of rollers 112 are mounted on each coupling member 110. The guide rails 108 are movably supported by a pair of guide rails 114 through the rollers 112 and the coupling members 110. The pair of guide rails 114 extend at the film setting position C and the photographing position D in a direction perpendicular to the rails 108. Therefore, the film holding unit 44 can be moved along both the first and second directions 60 and 62, and the X-ray film can be set at a desired position.

Guide rails 116 are integrally formed at the lower portions of the guide rails 108 to guide the projections 104, respectively. A notch 118 is formed in each guide rail 116. The drive mechanism 105 is arranged below the rails 108 to drive the projections 104. The drive mechanism 105 has operation pieces 120. The operation pieces 120 appear or disappear at the positions corresponding to the notches 118 to drive the projections 104.

As shown in FIG. 12, when the film holding unit 44 awaits loading of X-ray film p at the film setting position C, the rear plate 52 is spaced apart from the front plate 50 by a predetermined distance while the parallel relationship between the plates 50 and 52 is maintained. In this state, if the film p is inserted between the plates 50 and 52 by the film carrier 40, the operation pieces 120 are moved upward. The projections 104 are moved from the notches 118 to the guide rails 116, thereby driving the parallel link mechanism consisting of the first and second link plates 92 and 96 and the link rod 102. The rear plate 52 is pressed parallel to the front plate 50, and the film p is clamped between the plates 50 and 52 and brought into tight contact with the intensifying screens sheets 70. In the clamping state, the film holding unit 44 is moved by a carrier (not shown) from the film setting position C to the photographing position D. The projections 104 are separated from the operation pieces 120 but are guided along the guide rails 116. The film p is kept clamped between the plates 50 and 52. When the film holding unit 44 reaches the photographing position D, the object 48 is exposed with X-rays to form a roentgenogram.

Thereafter, as shown in FIG. 13, when the film holding unit 44 is moved from the photographing position D to the film setting position C, the projections 104 are engaged with the operation pieces 120 (FIG. 13). Subsequently, as shown in FIG. 12, when the operation pieces 120 are moved downward, the projections 104 pass through the notches 118 and are moved below the guide rails 116. Therefore, the rear plate 52 is separated from the front plate 50 by a predetermined distance while the parallel relationship therebetween is maintained. Finally, the film p is unloaded by the film carrier 40.

Figure 15:
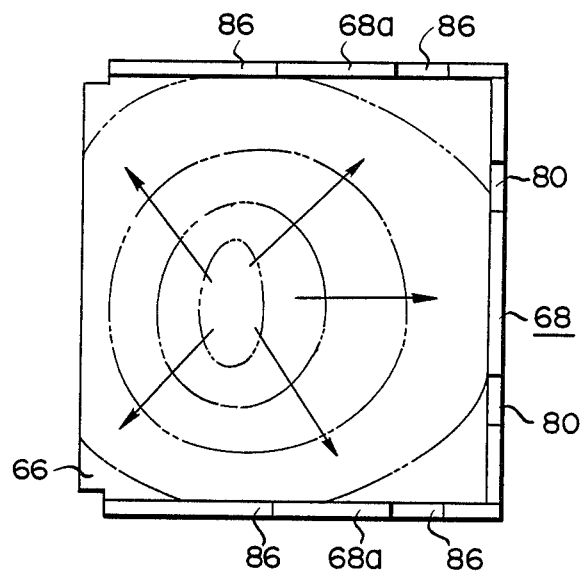

With the above construction, the surface 50a of the front plate 50 has the partial spherical surface 66 which is curved along both the first and second directions 60 and 62 and extends most at the film loading side. The surface 56a of the semicylindrical cushion member 56 on the rear plate 52 has the partial cylindrical surface 58 which is curved along the first direction 60 and parallel to the second direction 62. Upon completion of loading of the film p, the state of contact between the film p and the intensifying screen sheets 70 represents a substantially radial pressure distribution from the center, deviated to the film loading side (i.e., in the direction of arrows), as shown in FIG. 15. In other words, after pressing, a radial pressure gradient occurs wherein the central position has a maximum pressure. Therefore, an air layer which degrades image quality is not formed between the film and the intensifying screen sheets 70. Even if air is present between the film p and an intensifying screen sheet 70, it can be easily removed, thereby obtaining a roentgenogram with high quality.

Since the rear plate 52 is separated from the front plate 50 or comes close thereto while it is kept parallel to the latter, the opening size at the time of film loading can be minimized.

Furthermore, since the partial spherical surface 66 of the front plate 50 is curved along the first and second directions 60 and 62 and extends most at the film loading side thereof, the holding frame 68 is opened widely at the film insertion side at the time of pressing. However, since the rollers 106 are mounted at the center of each parallel frame portion 68a and its portion (i.e., the side opposite to the film insertion side) near the connecting frame portion 68b, errors do not occur in the positions of the rollers 106. Therefore, movability of the film holding unit 44 is not impaired.

In the above embodiment, the surface 50a of the front plate 50 has the partial spherical surface 66 curved along the first and second directions 60 and 62. The surface 56a of the semicylindrical cushion member 56 on the rear plate 52 comprises the partial cylindrical surface 58 curved along the first direction 60 but parallel to the second direction 62. However, the surfaces 50a and 56a may comprise surfaces curved along both the first and second directions 60 and 62.

What is claimed is:

1. An X-ray film holding apparatus for holding an X-ray film, said X-ray film holding apparatus comprising:
   (a) a front plate through which X-rays transmit and a rear plate, said front plate having an interior surface facing said rear plate and said rear plate having an interior surface facing said front plate, said front plate being flexible and having a periphery comprising a first part and a second part, said interior surface of said front plate being provided with a curved portion extending toward said rear plate, said curved portion being curved along first and second directions, the first and second directions crossing each other;
   (b) a holding fame for holding said first part of the periphery of said front plate in a plane while leaving said second part of the periphery of said front plate free to flex;
   (c) a cushion member having elasticity and being provided on said interior surface of said rear plate, said cushion member being provided with an interior surface facing said front plate, said interior surface of said cushion member being provided with a curved portion extending toward said front plate, said curved portion of said cushion member being curved along at least one of the first and second directions;
   (d) intensifying screen means lain between said interior surfaces of said front plate and said cushion member; and
   (e) supporting means for supporting said holding frame and said rear plate to provide tight contact between the X-ray film and said intensifying screen means,
   (f) wherein the deflection of said curved portion of said front plate from said plane defined by said holding frame is at its maximum at the midway point of said second part of the periphery of said front plate.

2. The apparatus according to claim 1, wherein said curved portion of said cushion member is curved along the first direction and parallel to the second direction.

3. The apparatus according to claim 1, wherein:
(a) said intensifying screen means comprise two intensifying screen sheets and
(b) said intensifying screen sheets are respectively adhered to said interior surfaces of said front plate and said cushion member.

4. The apparatus according to claim 1, wherein said supporting means comprises means for causing said front plate to come close to said rear plate or for causing said front plate to separate from said rear plate while keeping said front plate parallel to said rear plate.

5. The apparatus according to claim 1, wherein:
(a) the first and second directions are perpendicular to each other;
(b) said front plate has a rectangular shape;
(c) said holding frame comprises a pair of parallel frame portions for holding both side edges of said front plate and a connecting frame portion for connecting corresponding ends of said pair of parallel frame portions;
(d) said parallel frame portions are parallel to the first direction;
(e) said connecting frame portion is parallel to the second direction; such that
(f) the X-ray film can be inserted between said front and rear plates from a holding frame side opposite to said connecting frame portion.

6. The apparatus according to claim 5, wherein said supporting means comprises:
(a) a roller mounted at the center of each one of said parallel frame portions;
(b) a roller mounted at the connecting frame portion side of each one of said parallel frame portions; and
(c) a pair of guide rails for guiding said rollers along the first direction.

7. An X-ray film holding apparatus for holding an X-ray film, said X-ray film holding apparatus comprising:
(a) front and rear plates through which X-rays transmit, said front plate having an interior surface facing said rear plate and said rear plate having an interior surface facing said front plate, said front plate being flexible and having a periphery comprising a first part and a second part, said interior surface of said front plate being curved along two dimensions and extending toward said rear plate;
(b) a holding frame for holding said first part of the periphery of said front plate in a plane while leaving said second part of the periphery of said front plate free to flex;
(c) a cushion member having elasticity and being provided on said interior surface of said rear plate, said cushion member being provided with an interior surface facing said front plate, said interior surface of said cushion member being provided with a curved portion extending toward said front plate;
(d) intensifying screen means lain between said interior surfaces of said front plate and said cushion member; and
(e) supporting means for supporting said holding frame and said rear plate to provide tight contact between the X-ray film and said intensifying screen means,
(f) wherein the deflection of said curved portion of said front plate from said plane defined by said holding frame is at its maximum at the midway point of said second part of the periphery of said front plate.

8. The apparatus according to claim 7, wherein:
(a) said intensifying screen means comprises two intensifying screen sheets and
(b) said intensifying screen sheets are respectively adhered to said interior surfaces of said front plate and said cushion member.

9. The apparatus according to claim 7, wherein said supporting means comprises means for causing said front plate to come close to said rear plate or for causing said front plate to separate from said rear plate while keeping said front plate parallel to said rear plate.

10. The apparatus according to claim 7, wherein said curved portion of said cushion member comprises a partial cylindrical surface.

11. The apparatus according to claim 10, wherein:
(a) said front plate has a rectangular shape;
(b) said holding frame comprises a pair of parallel frame portions for holding both side edges of said front plate and a connecting frame portion for connecting corresponding ends of said pair of parallel frame portions; such that
(c) the X-ray film can be inserted between said front and rear plates from a holding frame side opposite to said connecting frame portion.

12. The apparatus according to claim 11, wherein said supporting means comprises:
(a) a roller mounted at the center of each one of said parallel frame portions;
(b) a roller mounted at the connecting frame portion side of each one of said parallel frame portions; and
(c) a pair of guide rails for guiding said rollers along the first direction.

* * * * *